United States Patent
Happel

(10) Patent No.: US 6,510,218 B1
(45) Date of Patent: Jan. 21, 2003

(54) PROCESS FOR DISTRIBUTING ENGAGEMENT REQUESTS DEPENDING ON DIRECTION IN TWO-WAY TRUNK GROUPS

(75) Inventor: Werner Happel, Bensheim (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/180,908
(22) PCT Filed: May 9, 1997
(86) PCT No.: PCT/EP97/02385

§ 371 (c)(1),
(2), (4) Date: Sep. 29, 1999

(87) PCT Pub. No.: WO97/44963

PCT Pub. Date: Nov. 27, 1997

(30) Foreign Application Priority Data

May 17, 1996 (DE) .......................... 196 19 996

(51) Int. Cl.⁷ .............................. H04M 7/00
(52) U.S. Cl. ............. 379/220.01; 379/137; 379/112.08; 379/240; 379/241
(58) Field of Search ........................... 379/111, 112.01, 379/112.05, 112.08, 112.1, 137, 220.01, 221.01, 221.07, 229, 240, 241, 32.01, 32.02

(56) References Cited

U.S. PATENT DOCUMENTS

| | | | |
|---|---|---|---|
| 4,199,665 A | | 4/1980 | Emrick et al. |
| 4,456,788 A | * | 6/1984 | Kline et al. .................. 379/137 |
| 5,101,451 A | * | 3/1992 | Ash et al. ............... 379/221.07 |
| 5,355,374 A | * | 10/1994 | Hester et al. ................ 370/461 |
| 5,428,607 A | * | 6/1995 | Hiller et al. ................. 370/352 |
| 5,467,391 A | * | 11/1995 | Donaghue, Jr. et al. ..................... 379/266.08 |
| RE36,416 E | * | 11/1999 | Szlam et al. ............. 379/88.09 |

FOREIGN PATENT DOCUMENTS

| | | |
|---|---|---|
| DE | 34 35 497 | 4/1986 |
| DE | 37 36 897 | 5/1989 |
| DE | 37 43 401 | 7/1989 |
| DE | 41 34 477 | 4/1993 |
| EP | 0 005 687 | 11/1979 |

OTHER PUBLICATIONS

A. Toda, "Traffic Design of Telecommunication Network with Both–Way Circuit Operation," Proceedings of the Twelfth International Teletraffic Congress—ITC12, Torino, Italy, Jun. 1–8, 1988, pp. 35–41.

(List continued on next page.)

Primary Examiner—Ahmad F. Matar
Assistant Examiner—Bing Bui
(74) Attorney, Agent, or Firm—Kenyon & Kenyon

(57) ABSTRACT

A method for directional distribution of allocation in two-way alternate line bundles which are switched between computer-assisted exchange facilities in voice and data networks. This traffic management method makes it possible to ensure full capability of a two-way alternate line bundle, while on the other hand, when traffic in one direction is temporarily dominant, traffic flow in the other direction is not impaired or displaced. A ratio for dividing the traffic in the outgoing and incoming directions is entered into the exchange facilities for the two-way alternate line bundle connecting them. The division ratio depends on the normal traffic flow in the outgoing and incoming directions. The allocation and direction of allocation of each line of the line bundle are constantly monitored by each of the two exchange facilities. As long as more than one line of the bundle is free, both exchange facilities can access the lines as required by the incoming connections. If only one line is free, the actual division ratio is considered and adapted to the theoretical division ratio.

7 Claims, 2 Drawing Sheets

OTHER PUBLICATIONS

A. Toda, et al., "Selection Method for Both–Way Circuit Groups Between Multiunit Offices," Electronics and Communications in Japan, Part 1, vol. 69, No. 10, Oct. 1986, pp. 93–101.

A. Toda, "Traffic Control Strategies for a Both–Way Circuit–Group," Electronics and Communications in Japan, Part 1, vol. 68, No. 9, Sep. 1985, pp. 88–97.

Proceedings of the Twelfth International Teletraffic Congress—ITC12, Bd. 1, 1.—Jun. 8, 1988 Torino (IT), Seiten 35–41, XP00279758 A. Toda: "Traffic design of telecommunications network with both–way circuit operation" siehe Siete 38, Absatz 3.2.

Electronics and Communications in Japan—Part 1—Communications, vol. 69, No. 10, Oct. 1986, Silver Spring (US), pp. 93–101, XP002038822. A. Toda Et Al: "Selection Method for both–way circuit groups between Multiunit Offices".

Electronics and Communications in Japan—Part 1, vol. 68, No. 9, Sep. 21985, New York (US), pp. 88–97, XP002038829. A. Toda: "Traffic Control Strategies for Both–way circuit group".

* cited by examiner

PROCESS FOR DISTRIBUTING ENGAGEMENT REQUESTS DEPENDING ON DIRECTION IN TWO-WAY TRUNK GROUPS

FIELD OF THE INVENTION

The present invention concerns a method of directional distribution of allocation in two-way alternate line bundles.
Related Technology Line bundles in voice and data networks switched between computer-controlled exchange facilities are generally operated as two-way alternate lines. In this operating mode, both exchange facilities independently of one another can access free lines of the bundle and occupy them. The full capability of the line bundle is utilized in this way. However, with this operating mode there is the risk that when one direction of traffic is temporarily dominant, traffic flow in the other direction may be hindered or even displaced. The grade of service in this direction is thereby greatly reduced.

Two traffic management methods for preventing such displacement are known. The first method operates by introducing the traffic management function "trunk reservation" and in the second method by dividing the traffic connection in question three ways.

In "trunk reservation" one direction of traffic is preferred in that the last free line is kept free for this direction. This means that only the preferred direction can have access to the last free line. Thus, given the same starting situation, a requested connection in the direction that is not protected would be rejected and would thus fail.

The trunk reservation method yields the disadvantage that only one direction is protected, and traffic in the other direction can be displaced when the protected direction has a similarly high demand.

A method for democratically protecting both directions from displacement by the other direction is a three-way division of the traffic relationship in question. The lines of a bundle are divided into three partial bundles as follows: a directionally operated partial bundle for the basic traffic of the outgoing direction, a directionally operated partial bundle for the basic traffic of the incoming direction, and a partial bundle with two-way alternate operation which can be used in both directions by peak traffic.

When traffic in one direction is dominant, displacement of the traffic from the opposite direction can with the second method occur in the two-way alternate partial bundle but not in the directional partial bundle in the opposite direction.

A disadvantage of this operating mode is that full capability of a two-way alternate line bundle cannot be achieved. Thus, more lines are needed for handling a certain amount of traffic than are actually necessary.

Prior traffic management methods are summarized and described in principle in CCITT Recommendation E.412 "Network Management Controls" (10/92) by INTERN: TELECOMMUNICATION UNION.

SUMMARY OF THE INVENTION

An object of the present invention is to ensure the full capability of a two-way alternate bundle while at the same time precluding mutual displacement for both directions of traffic.

Therefore, an object of the present invention is to create a method of directional distribution of allocation in two-way alternate line bundles arranged between computer-controlled exchange facilities that will ensure full capability of the two-way alternate line bundle, preclude mutual displacement of the traffic in both directions and make the division ratio on one line adaptable exactly to the actual conditions.

The measure proposed according to the present invention is characterized in particular in the characterizing part of Patent Claim 1.

Additional features of the present invention and embodiments are derived from the characterizing parts of Patent Claims 2 through 6 which follow Patent Claim 1.

Advantages of the traffic management according to the present invention include that the full capability of the two-way alternate operating mode is utilized, and displacement in favor of one.

The method according to the present invention thus permits savings in numbers of lines and results in a balanced traffic distribution between the outgoing and incoming traffic of a line bundle and thus to an improvement in the grade of service—even under unusual traffic conditions.

BRIEF DESCRIPTION OF THE DRAWINGS

The present invention will now be described in greater detail on the basis of in the drawings in which.

DETAILED DESCRIPTION

The following definitions apply herein.

VE A or B: exchange facility A or B

TV: division ratio

Soll-TV: theoretical division ratio

Ist-TV: actual division ratio

Figure 1:
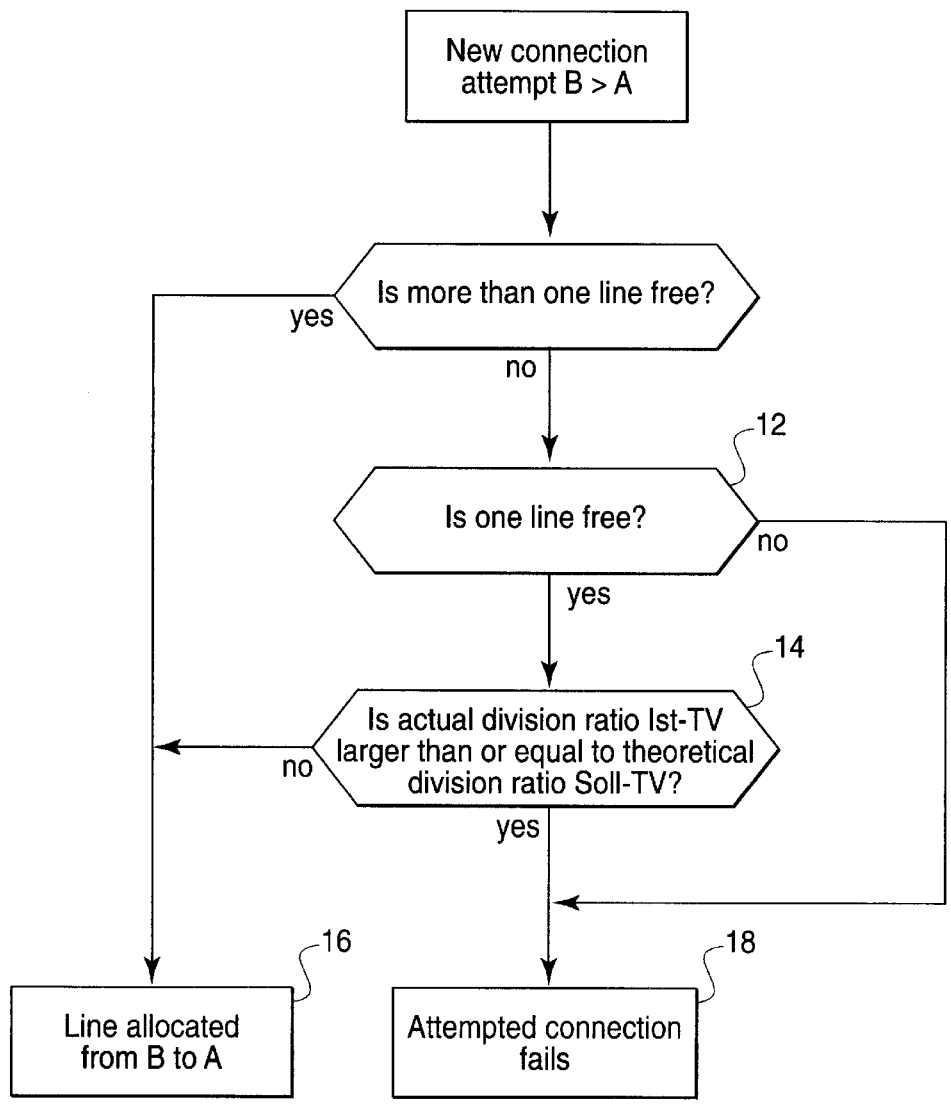
FIG. 1 shows a flow chart for a directional distribution of allocation with two-way alternate line bundles.

The operation of the method according to the present invention for directional distribution of allocation with two-way alternate line bundles is described below on the basis of the flow chart illustrated in FIG. 1. Actual division ratio Ist-TV is based on the prevailing allocation status without taking into account the pending new connection.

A ratio for the division of traffic into outgoing and incoming directions is entered into exchange facilities VE A and VE B for the two-way alternate line bundle connecting them. Division ratio TV depends on the normal amount of traffic flow in outgoing and incoming directions.

The allocations and allocation direction of each line are constantly monitored by each of the two exchange facilities VE A and VE B.

As long as more than one line of the line bundle is free, the ratio between outgoing and incoming traffic can vary freely, i.e., both exchange facilities VE A and VE B can access the lines as required by the arriving allocations.

If only one line is free, the division ratio is considered, as shown in blocks 12 and 14.

If the instantaneous ratio between the lines allocated to outgoing and incoming traffic, as seen from exchange facility VE B, is smaller than theoretical division ratio Soll-TV, the new connection pending at exchange VE B is switched through, as shown in block 16. Actual division ratio Ist-TV is then corrected in the direction of theoretical division ratio Soll-TV.

A connection in the reverse direction being established at exchange facility VE A at the same time would have found actual division ratio Ist-TV to be too large for exchange facility VE A for the same starting situation, and thus the connection would have failed, as shown in block 18. Had this connection been switched through, actual division ratio Ist-TV would have been farther from theoretical division ratio Soll-TV, and thus traffic in the opposite direction would have been displaced.

No special synchronization between two exchange facilities VE A and VE B is necessary. Synchronization occurs automatically through monitoring the allocated lines from both exchange facilities VE A and VE B.

New actual division ratio Ist-TV is changed in the direction of theoretical division ratio Soll-TV with each newly-free, and thus allocatable line by monitoring of the last free line and exclusive allocation of this line to a connection in the correct direction, even if the bundle was underloaded and actual division ratio Ist-TV is far removed from theoretical division ratio Soll-TV.

With large or very large line bundles having several hundred lines, it may be necessary to inquire about division ratio TV not only for the last line but also for the penultimate line, the antepenultimate line, etc., to achieve a faster approximation of actual division ratio Ist-TV to theoretical division ratio Soll-TV. Theoretical division ratios Soll-TV for the individual line bundles are expediently calculated when designing the network and entered later into exchange facilities VE when configuring the line bundles.

The method according to the present invention may be used with traffic relationships which are operated as two-way alternate last-choice routes. It may be used in particular where today the trunk reservation function is entered and where line bundles are currently divided three ways.

Figure 2:
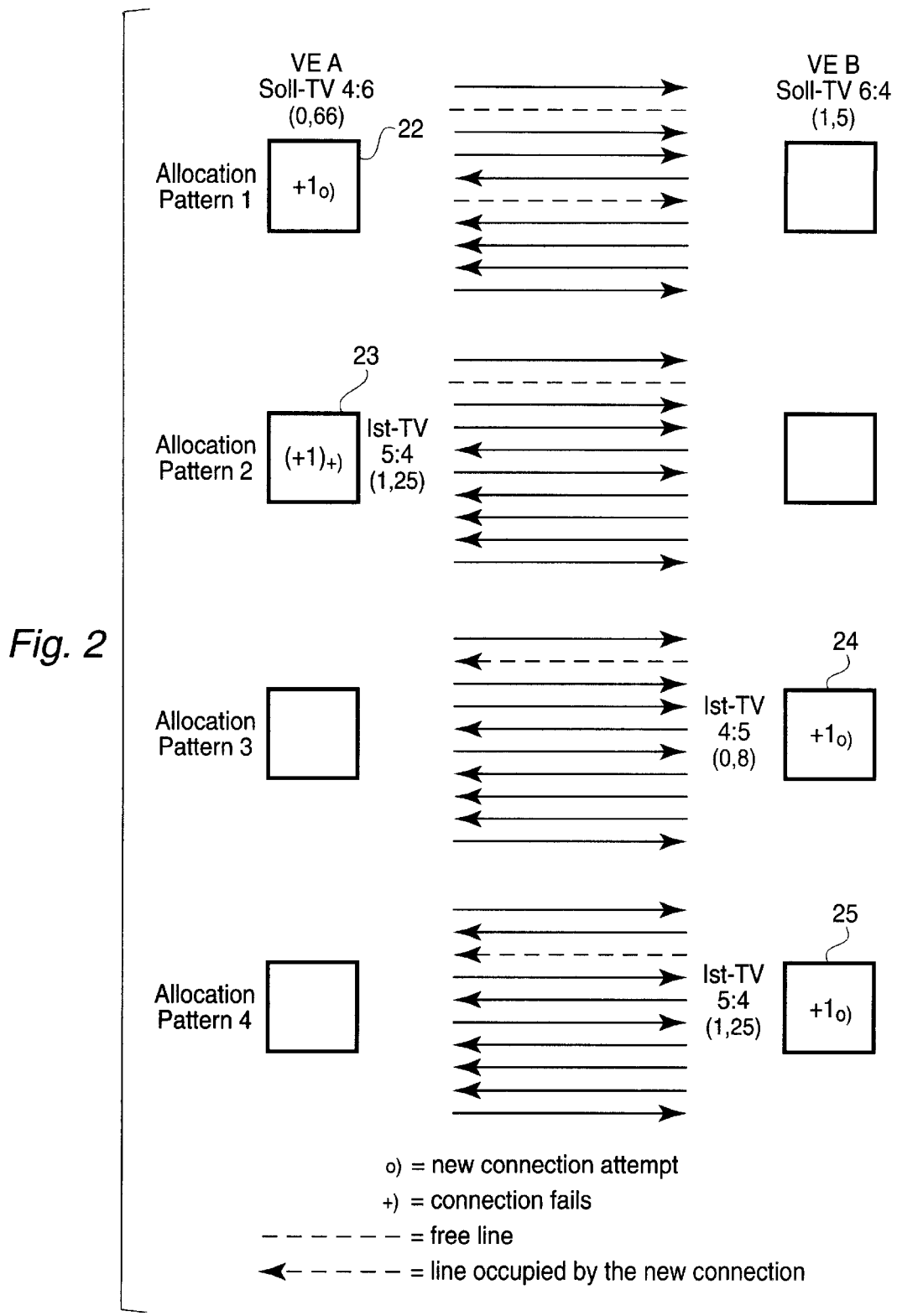
FIG. 2 shows a schematic example of a directional distribution of allocation with two-way alternate line bundles.

FIG. 2 contains examples 1–4 of a typical allocation pattern for a two-way alternate line bundle.

With a two-way alternate line bundle, the traffic ratio is normally 60:40 in favor of the traffic from exchange facility VE B to exchange facility VE A. It is assumed that ten lines are switched. The number of lines is then divided in a 60:40 ratio and entered into exchange facility VE B as theoretical division ratio Soll-TV 6:4 and into exchange facility VE A as theoretical division ratio Soll-TV 4:6. This means that, from the standpoint of exchange facility VE B—with a normal distribution of traffic and full load—six lines will be allocated in the outgoing direction and four lines in the incoming direction. From the standpoint of exchange facility VE A, this is reversed, i.e., four lines outgoing and six lines incoming.

With allocation pattern 1, more than one line is free. When a connection attempt arrives (at exchange facility VE A here as indicated by the numeral "+1" in block 22), the connection is switched through without taking actual division ratio Ist-TV into account. With allocation pattern 2, only one line is free. If another connection attempt arrives at one of two exchange facilities VE A or B, actual division ratio Ist-TV is taken into account. In the example illustrated here, the new connection is pending at exchange facility VE A, as indicated by the numeral "+1"in block 23). Actual division ratio Ist-TV for exchange facility VE A is 5:4 (1.25), which is thus larger than theoretical division ratio Soll-TV 4:6 (0.66) of exchange facility V EA the pending connection at exchange facility VE A.

Allocation pattern 3 is identical to allocation pattern 2, i.e., only one line is free. However, the new connection is pending now at exchange facility VE B (as indicated by the numeral "+1" in block 24) where actual division ratio Ist-TV is 4:5 (0.8) and is thus smaller than theoretical division ratio Soll-TV 6:4 (1.5) of exchange facility VE B. Exchange facility VE B occupies the last free line. New actual division ratio Ist-TV 5:5 (1.0) at exchange facility VE B thus approaches theoretical division ratio Soll-TV.

In allocation pattern 4, the line which has just become free can be seized only by exchange facility VE B because actual division ratio Ist-TV of exchange facility VE A 4:5 (0.8) is still larger than theoretical division ratio Soll-TV. Actual division ratio Ist-TV 5:4 (1.25) at exchange facility VE B, however, is still smaller than theoretical division ratio Soll-TV 6:4 (1.5). Thus, a new connection pending at exchange facility VE B, as indicated by the numeral "+1" in block 25, is switched through. New actual division ratio Ist-TV at exchange facility VE B assumes the magnitude of theoretical division ratio Soll-TV due to the new allocation.

What is claimed is:

1. A method for directional distribution of allocation of a two-way alternate line bundle in a network between first and second computer-controlled exchange facilities operated in the two-way alternate mode, the first and second exchange facilities being capable, independently of one another, of accessing and occupying free lines of the line bundle, the method comprising:

entering into the first and second exchange facilities a respective predetermined outgoing and incoming traffic division ratio for the two-way alternate line bundle, the respective predetermined division ratio being a function of the normal traffic flow in outgoing and incoming directions;

continuously and dynamically monitoring an allocation and direction of allocation of each line of the line bundle using each of the first and second exchange facilities;

comparing the respective predetermined division ratio at one of the first and second exchange facilities to an instantaneous division ratio between outgoing and incoming allocated lines at the one exchange facility; and switching through a connection pending at the one exchange facility when the instantaneous division ratio is smaller than the respective predetermined division ratio, and at the same time correcting the instantaneous division ratio toward the predetermined division ratio.

2. The method as recited in claim 1 wherein the network is at least one of a voice and data network.

3. The method as recited in claim 1 further comprising automatically synchronizing the first and second exchange facilities by the monitoring of the allocation of the lines of the line bundle.

4. The method as recited in claim 1 wherein the comparing and switching through steps are performed only when a predetermined number of lines of the line bundle are free, and wherein the instantaneous division ratio at the first and second exchange facilities is freely variable when more than one line of the line bundle is free.

5. The method as recited in claim 1 wherein the comparing step is performed only when one line of the line bundle is free, and wherein the instantaneous division ratio at the first and second exchange facilities is freely variable when more than one line of the line bundle is free.

6. The method as recited in claim 1 further comprising:
   calculating the respective predetermined division ratios for the line bundle when designing the network; and
   entering the respective predetermined division ratios into the first and second exchange facilities when configuring the line bundles.

7. The method as recited in claim 1 wherein the method is usable in traffic relationships operated as two-way alternate last-choice routes.

* * * * *